United States Patent
Eppich

[19]

[11] Patent Number: 6,039,559

[45] Date of Patent: Mar. 21, 2000

[54] APPARATUS FOR DISPLACING A PLASTICIZING AND INJECTION UNIT

[75] Inventor: Stefan Eppich, Arbing, Austria

[73] Assignee: Engel Maschinenbau Gesellschaft m.b.H., Schwertberg, Australia

[21] Appl. No.: 09/032,559

[22] Filed: Feb. 27, 1998

[30] Foreign Application Priority Data

Mar. 5, 1997 [AT] Austria ................................. 135/97 U

[51] Int. Cl.[7] ................................................ B29C 45/58
[52] U.S. Cl. ................................................................ 425/574
[58] Field of Search ............................. 425/574, 186, 425/190, 192 R; 264/328.11

[56] References Cited

U.S. PATENT DOCUMENTS

| | | | |
|---|---|---|---|
| 2,632,208 | 3/1953 | Belden et al. | 425/574 |
| 3,836,301 | 9/1974 | Hehl | 425/192 |
| 4,753,589 | 6/1988 | Hehl | 425/574 |
| 5,007,816 | 4/1991 | Hehl | 425/574 |
| 5,462,428 | 10/1995 | Ito et al. | 425/574 |

FOREIGN PATENT DOCUMENTS

| | | |
|---|---|---|
| 0580975 | of 1993 | European Pat. Off. . |
| WO/9530529 | of 1995 | WIPO . |

*Primary Examiner*—Jill L. Heitbrink
*Attorney, Agent, or Firm*—Notaro & Michalos P.C.

[57] ABSTRACT

Apparatus for displacing a plasticising and injection unit with respect to the stationary die platen of an injection moulding machine and for producing the contact pressure of the nozzle of said plasticising and injection unit on the mould-half arranged on the stationary die platen, wherein the forces required for displacing the plasticising and injection unit (1) is applied to the plasticising and injection unit (1) by means of cables, chains (10, 10') and the like.

(FIG. 1)

9 Claims, 2 Drawing Sheets

APPARATUS FOR DISPLACING A PLASTICIZING AND INJECTION UNIT

FIELD AND BACKGROUND OF THE INVENTION

The present invention relates to an apparatus for displacing a plasticising and injection unit with respect to the stationary die platen of an injection moulding machine and for producing contact pressure of the nozzle of said plasticising and injection unit on the mould-half arranged on the stationary die platen.

Due to customer demand, efforts are being made to an increasing extent to offer electrically driven injection moulding machines commercially, in addition to the generally standard hydraulically driven injection moulding machines. It is known, for example from EP 0 580 975 A1, to use an electric spindle drive for the special function of driving the plasticising and injection unit. A similar solution was proposed in WO 95/30529, although in this case two electric spindle drives are used.

SUMMARY OF THE INVENTION

The object of the invention is, in this context, to provide a novel, constructively simplified apparatus for displacing the plasticising and injection unit of an injection moulding machine.

This is solved according to the invention in that the forces required for displacing the plasticising and injection unit can be applied to the plasticising and injection unit by means of cables, chains and the like. As the cables or chains provided according to the invention can be guided in any manner by means of rollers, optimum reactions to the prevailing spatial conditions can be made using this solution.

Because of their large length, electric spindle drives are particularly problematic when a large contact pressure stroke is present. For this application, the preferred embodiment of the solution according to the invention is in that the cables or chains can be wound and unwound on a drum connected to an electric drive mechanism. According to the circumference of the drum, the cables or chains are wound and unwound at differing frequencies around the drum during displacement of the plasticising and injection unit.

Further features and details of the present invention will be evident from the description of the attached drawings, which schematically show the apparatus according to the invention.

DESCRIPTION OF THE PREFERRED EMBODIMENTS

Figure 1:
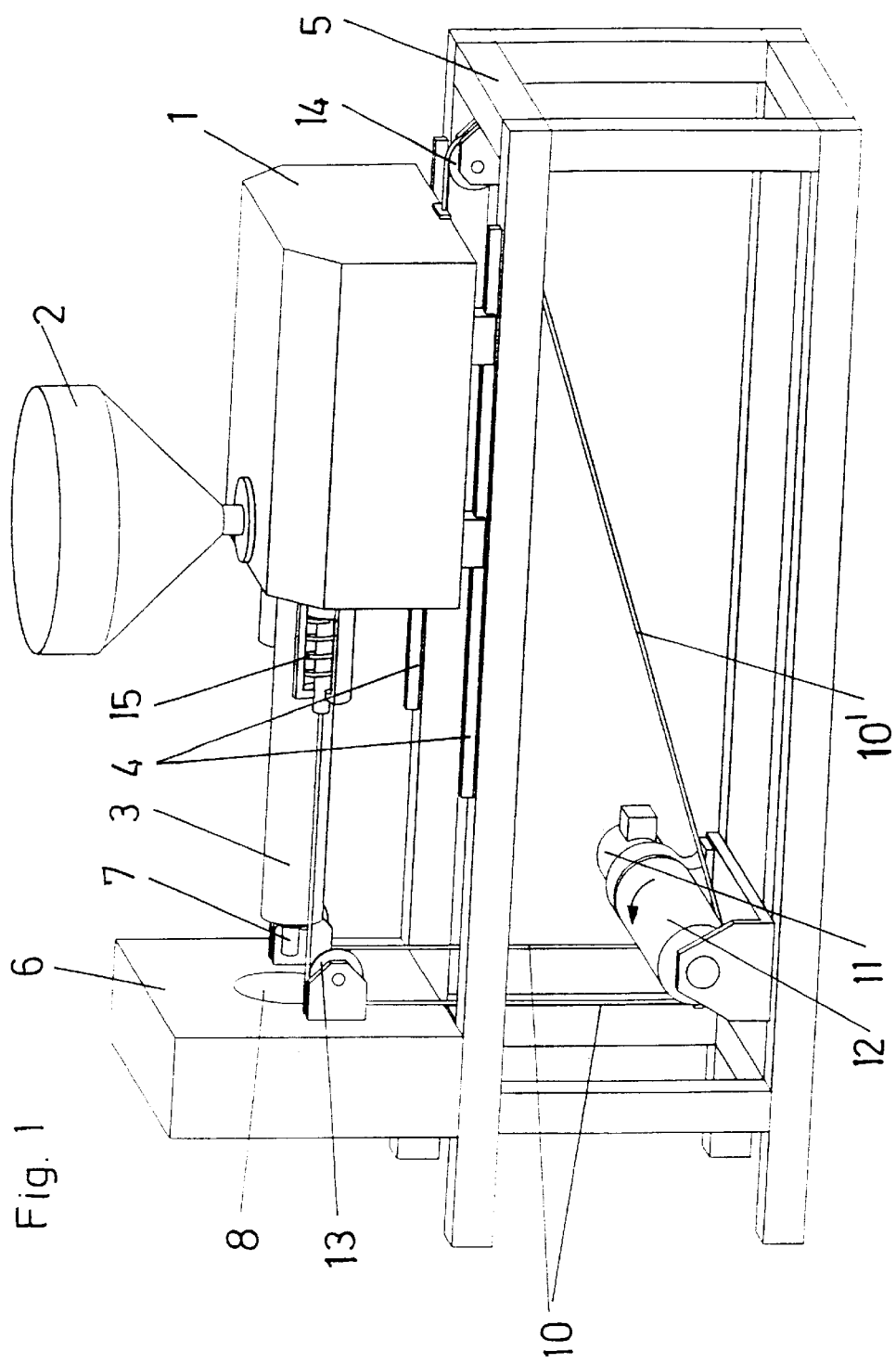
FIG. 1 shows a first.

On a frame 5 there is located the plasticising and injection unit 1 with the mass funnel 2 fitted onto it, wherein the unit is movably mounted on guide rails 4. In order to fill the mould with molten plastics, the plasticising and injection unit 1 must be displaced from the position shown until the nozzle 7 of the plasticising cylinder 3 sits tightly against the mould-half arranged on the stationary die platen 6. The gate of the mould-half (not shown) arranged on the stationary die platen is then at the outlet, which is not visible, of the through channel 8.

As shown further in FIG. 1, chains 10 and 10' are provided according to the invention for displacing the entire plasticising and injection unit including the plasticising cylinder. A single chain 10' which is guided by the roller 14 engages with the end of the plasticising and injection unit 1 opposite the mould. In order to carry out the opposite movement, towards the mould, two chains 10 are provided in a symmetrical arrangement, which are guided on rollers 13. The driving of the chains 10 and 10' is done using an electric motor 11 and a drum 12 connected thereto, onto which the ends of the chains 10 and 10' are joined in order to be wound onto it.

If the plasticising and injection unit has to be moved towards the mould 1, the electric motor 11 together with the drum 12 begins to move in the direction of the arrow, whereby the chains 10 fastened to the drum 12 are wound onto the drum 12. In the embodiment shown, a 270° rotation of the drum is sufficient to carry out the whole contact pressure stroke. However, a smaller drum could equally well be used, on which the chains are wound in several windings. It is, however, relatively difficult to guide the chains suitably as they are heavy due to the large forces occurring. If the drum 12 rotates in the direction of the arrow, not only are the chains 10 wound, but simultaneously the chain 10' leading to the rear end of the plasticising and injection unit 1 is unwound and therefore released. When the unit is retracted away from the mould, the procedures described take place in the opposite manner.

It is particularly advantageous in the case of the embodiment shown, that the chains 10 do not engage directly with the plasticising and injection unit 1, but instead are coupled indirectly by means of springs 15. In this way, on the one hand the nozzle 7 of the plasticiser cylinder 3 can be conveyed at relatively high speed towards the stationary mould-half arranged on the stationary die platen 6 as the springs 15 act in a shock absorbing manner, and on the other hand the springs 15 can be strongly enough compressed by means of a subsequent short continuation of the electric motor 11, that the electric motor 11 can be briefly switched off and stopped during the filling of the mould with molten plastics, as the spring force of the disc spring 15 is sufficient for close contact of the nozzle 7 on the mould-half arranged on the stationary die platen 6.

Figure 2:
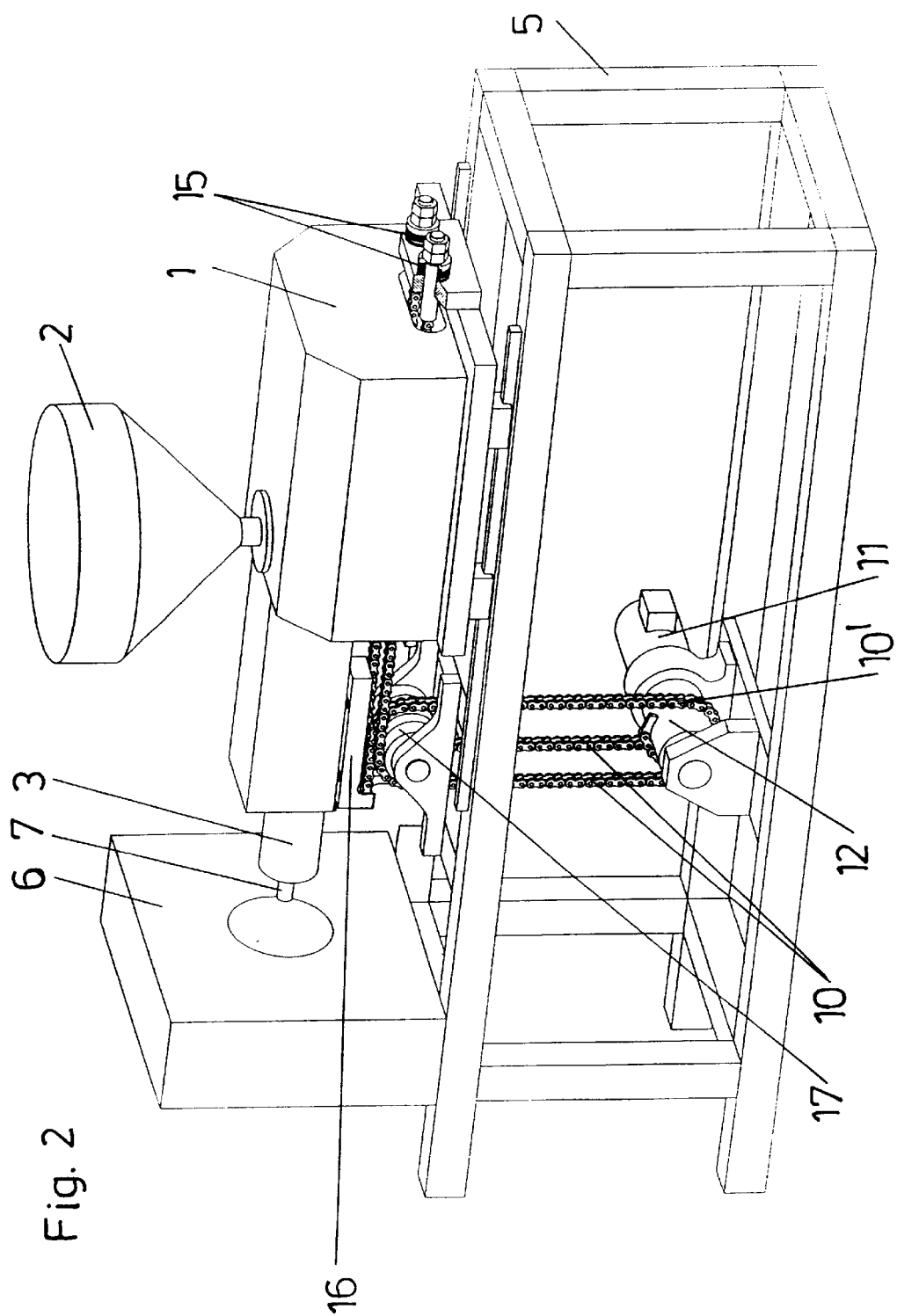
FIG. 2 a second embodiment of the invention.

The embodiment shown in FIG. 2 differs in the manner in which the chains 10 and 10' engage with the plasticising and injection unit. The two chains 10, with which the plasticising and injection unit is displaced towards the mould, pass through the unit and are fastened to its rear side by means of corresponding fixing devices. It is important here, that the chains 10 are again indirectly in contact with the plasticising and injection unit, with the interposing of disk springs 15. The guiding of the chains 10 is done by means of a drum 17, over which the chain 10' is also guided, with which chain 10' the plasticising and injection unit can be pulled back. The chain 10' here engages with a bracket 16, which is tightly fastened to the plasticiser cylinder 3. In order to make an opposite movement of the different chains possible, the drum 17 is divided into segments which are rotatable independently of one another. In general, see the embodiment according to FIG. 1 for the course of movement.

Instead of chains 10, 10', cables or the like may be used which are referred to here generally as flexible elongated traction members.

What is claimed is:

1. Apparatus for displacing a plasticising and injection unit with respect to a stationary die platen of an injection moulding machine and for producing a contact pressure on a nozzle of said plasticising and injection unit on a mould-half arranged on the stationary die platen, comprising: at least one flexible elongated traction member (10, 10') connected to the plasticising and injection unit (1); and drive means engaged with the flexible elongated traction member for applying tractive forces to the plasticising and injection unit (1) for moving the unit away from the mould-half and for moving the unit toward the mould-half and applying the nozzle with force against the mould-half.

2. Apparatus according to claim 1, wherein the drive means for applying tractive forces required for displacing the plasticising and injection unit comprises an electric drive mechanism (11) engaged with the at least one flexible elongated traction member.

3. Apparatus according to claim 2, wherein the electric drive mechanism comprises a drum for winding and unwinding the at least one flexible elongated traction member and electric motor means connected to the drum for rotating the drum in a forward and in a reverse direction.

4. Apparatus according to claim 1, including spring means connected between the elongated traction member and the plasticising and injection unit for indirectly connecting the elongated traction member to the plasticising and injection unit through the spring means.

5. Apparatus according to claim 4, wherein said spring means comprises a disc spring.

6. Apparatus according to claim 1, wherein said at least one elongated traction member comprises a first elongated traction member having a first end connected to the unit and an opposite end engaged with the drive means for moving the unit away from the mould-half with rotation of the drive unit in a first direction, and at least one second elongated traction member having one end connected to the unit and an opposite end engaged with the drive means for moving the unit toward the mould-half and applying the nozzle with force against the mould-half with activation of the drive unit in a second opposite direction.

7. Apparatus according to claim 6, wherein said drive means comprises a drum and motor means for rotating the drum in the first and second directions, the opposite ends of the first and second elongated traction members being connected to the drum and being wound on the drum with rotation of the drum in the first and second directions.

8. Apparatus according to claim 7, wherein the one end of the first elongated traction member is connected to an end of the unit which is opposite from the nozzle and the one end of the second elongated traction member is connected to an end of the unit which is nearest the nozzle, and at least one roller for each elongated traction member, each roller being mounted for rotation to the injection moulding machine and being engaged by one of the elongated traction members.

9. Apparatus according to claim 7, including a second drum mounted for rotation to the moulding machine, the first and second elongated traction members being wound on the second drum.

* * * * *